Patented Feb. 24, 1925.

1,527,942

UNITED STATES PATENT OFFICE.

LOUIS WEISBERG, OF NEW YORK, N. Y.

RECOVERY OF SILVER FROM SOLUTIONS USED IN PHOTOGRAPHIC WORK AND REGENERATION OF SUCH SOLUTIONS FOR FURTHER USE.

No Drawing. Application filed July 14, 1923. Serial No. 651,636.

*To all whom it may concern:*

Be it known that I, LOUIS WEISBERG, a citizen of the United States, residing at New York city, in the county of New York and State of New York, have invented new and useful Improvements in the Recovery of Silver from Solutions Used in Photographic Work and Regeneration of Such Solutions for Further Use, of which the following is a specification.

This specification relates to a process for recovering silver from solutions used in photographic work and for regenerating such solutions for use again. It is well known that in photographic work thin films containing compounds of silver are applied to sheets of glass, paper, celluloid, or other material. These silver compounds are sensitive to light, and after being properly exposed to the action thereof, they are treated with a developer to bring out the image, which is then fixed by removing the unchanged silver remaining. The fixing treatment is carried out by washing with a solution in which the unchanged silver will dissolve. The solution used for this purpose ordinarily contains sodium thiosulphate and is commonly spoken of as hypo. As the hypo solution is used, the silver content increases, and by the time the solution becomes unfit for use, the value of the dissolved silver is considerable. The object of this invention is to recover the silver dissolved in the fixing solution and particularly to bring about the recovery of this silver in a manner permitting the hypo solution to be used again as a fixing bath.

The separation and recovery of silver from fixing solutions, particularly hypo solutions, is regularly carried out in many places where the amount of silver thus obtainable justifies it, but the methods in common use interfere with the further use of the fixing solution after the silver has been separated therefrom. After recovery of the silver, it is usual to run the solution to waste, although it contains practically the whole amount of hypo originally employed. The cost of the hypo so wasted is considerable, and it would be a valuable improvement to save the hypo as well as the silver.

The separation of silver from fixing solutions is often brought about by treatment with sodium sulphide or zinc. With sodium sulphide especially, there is produced a strong and unpleasant odor because the fixing solution frequently contains enough acidic materials to cause evolution of hydrogen sulphide. Zinc, on the other hand, works with comparative slowness. In U. S. Patent No. 1,448,475, I have described a method of silver recovery that is free from odor and easy to carry out. However, that method does not permit the solution to be used again after the silver has been recovered, nor is it as quick and cheap as the method herein described. The present method is also entirely odorless.

In the present invention, the active agent by means of which the dissolved silver is caused to separate from the solution is insoluble, and the products formed from it in acting on the silver are also insoluble. Consequently any unused excess of precipitant may be removed, together with the precipitated silver and other reaction products, by any appropriate means, such as settling and decanting, or filtering. The solution, after separation of these insoluble solids, contains substantially all of the hypo. Sometimes the fixing solution contains other materials besides hypo, as for example, aluminum sulphate. The materials used to throw down the silver usually throw down some or all of the aluminum sulphate, and in that case more aluminum sulphate will have to be added to the solution after the silver has been separated in order to use the solution again as a fixing bath.

In carrying out this invention I make the solution which contains the dissolved silver alkaline, preferably by the addition of lime or limestone, and then I add ferrous hydroxide to precipitate the silver. It is important to add enough lime or other alkali to maintain a slightly alkaline reaction in the solution, for otherwise the precipitation of silver is not complete. Instead of adding lime first and then ferrous hydroxide, I may add them simultaneously, or in the opposite order. Furthermore, instead of adding ferrous hydroxide as such, it is often more convenient to add a mixture of materials which react to form ferrous hydroxide, such as lime and ferrous sulphate. Lime and ferrous sulphate react to form calcium sulphate and ferrous hydroxide, both of which are insoluble and therefore cause no interference with the further use of the solution. It is obvious that other substances might be brought together to bring about a similar result, but I prefer to use lime and ferrous sulphate because of their cheapness, availability, and the insoluble nature of the products formed. I may add lime and ferrous sulphate in the solid form or after dissolving them; or I may bring the lime and ferrous sulphate together so as to cause them to react first and then add the resultant precipitate to the solution containing the silver.

Instead of adding ferrous hydroxide and lime, I may add ferrous hydroxide and any other convenient alkali. Likewise in place of ferrous sulphate, I may employ any convenient ferrous salt which will react to form ferrous hydroxide and an insoluble salt of the alkali employed.

The amounts of alkali and ferrous iron compound which I employ are usually just barely in excess of that theoretically required for the reduction of the silver. For a solution containing one avoirdupois pound of silver, I use approximately 2.6 pounds of commercial ferrous sulphate and 1.3 pounds of lime. For acid solutions the amount of lime required may go above this proportion. A mixture of ferrous sulphate and lime in equal parts by weight is satisfactory in practically all cases.

Ferrous sulphate in the absence of lime, or other alkali, brings about some precipitation of silver, but the reaction is slow and incomplete. Ferrous sulphate and lime together cause the silver to precipitate within a few minutes, and the solution which has been treated by this method does not contain enough silver to give a precipitate of silver sulphide when treated with sodium sulphide.

This invention is applicable whether the silver compound used in the sensitive film contains chlorine, bromine, or iodine, and regardless of what developer is used in bringing out the image. Although I have described my invention with particular reference to the hypo solutions employed by photographers and photoengravers, it is evident that this method of silver recovery is also applicable to many other waste solutions containing silver. It is also applicable to solutions containing other noble metals, such as gold and platinum.

The silver precipitated by this method, together with the other insoluble solids, may be separated from the solution by any convenient means, but generally speaking filtration is required before the hypo solution is ready for use again. When aluminum sulphate or similar materials are added, some sediment may be formed, which is best removed by filtration. After the silver has been separated from the solution, the details of the subsequent treatment will depend upon the kind of fixing solution that is being employed, and particularly on whether the fixing bath is being used in the neutral condition or as an acid hardening bath. In the former case, nothing is required but to make sure that the solution is not excessively alkaline; if acid is required to neutralize the alkalinity, a weak organic acid may be employed. If an acid hardening bath is desired, sufficient aluminum sulphate or other acidic material is added.

I claim:

1. The process of recovering silver from solutions used in photographic work and regenerating such solutions for further use, which comprises subjecting the silver to the action of ferrous hydroxide in the presence of alkali.

2. The process of recovering silver from hypo solutions and regenerating the hypo solutions for further use, which comprises subjecting the silver to the action of ferrous hydroxide in the presence of alkali.

3. The process of recovering silver from solutions used in photographic work, which comprises subjecting the silver to the action of ferrous hydroxide in the presence of alkali.

4. The process of recovering silver from hypo solutions, which comprises subjecting the silver to the action of ferrous hydroxide in the presence of alkali.

5. The process of recovering silver from solutions used in photographic work and regenerating such solutions for further use, which comprises subjecting the silver to the action of ferrous hydroxide in the presence of lime.

6. The process of recovering silver from hypo solutions and regenerating the hypo solutions for further use, which comprises subjecting the silver to the action of ferrous hydroxide in the presence of lime.

7. The process of recovering silver from solutions used in photographic work, which comprises subjecting the silver to the action of ferrous hydroxide in the presence of lime.

8. The process of recovering silver from hypo solutions, which comprises subjecting the silver to the action of ferrous hydroxide in the presence of lime.

9. The process of recovering silver from solutions used in photographic work and regenerating such solutions for further use, which comprises subjecting the silver to the action of ferrous sulphate and lime, substantially as described.

10. The process of recovering silver from hypo solutions and regenerating the hypo solutions for further use, which comprises subjecting the silver to the action of ferrous sulphate and lime, substantially as described.

11. The process of recovering silver from solutions used in photographic work, which comprises subjecting the silver to the action of ferrous sulphate and lime, substantially as described.

12. The process of recovering silver from hypo solutions, which comprises subjecting the silver to the action of ferrous sulphate and lime, substantially as described.

13. The process of recovering silver from solutions used in photographic work and regenerating such solutions for further use, which comprises subjecting the silver to the action of ferrous sulphate and lime and then separating the precipitated silver and other solids from the solution.

14. The process of recovering silver from hypo solutions and regenerating the hypo solutions for further use, which comprises subjecting the silver to the action of ferrous sulphate and lime and then separating the precipitated silver and other solids from the solution.

15. The process of recovering silver from solutions used in photographic work, which comprises subjecting the silver to the action of ferrous sulphate and lime and then separating the precipitated silver and other solids from the solution.

16. The process of recovering silver from hypo solutions, which comprises subjecting the silver to the action of ferrous sulphate and lime and then separating the precipitated silver and other solids from the solution.

17. The process of recovering silver from solutions used in photographic work and regenerating such solutions for further use, which comprises subjecting the silver to the action of ferrous sulphate and lime, separating the precipitated silver and other solids from the solution, and then adding to the solution the elements, other than silver, precipitated by the action of the ferrous sulphate and lime.

18. The process of recovering silver from hypo solutions and regenerating the hypo solutions for further use, which comprises subjecting the silver to the action of ferrous sulphate and lime, separating the precipitated silver and other solids from the solution, and then adding to the solution the elements, other than silver, precipitated by the action of the ferrous sulphate and lime.

LOUIS WEISBERG.